Oct. 26, 1971  W. SCHLAGMÜLLER ETAL  3,614,945
VALVE FOR ADMITTING FUEL INTO INTAKE MANIFOLDS OF INTERNAL
COMBUSTION ENGINES DURING STARTING
Filed July 22, 1969  3 Sheets-Sheet 1

INVENTORS
Walter SCHLAGMÜLLER
Otto GLÖCKLER
Dieter EICHLER
Hans ZELLER
Rudolf BABITZKA
By
their ATTORNEY

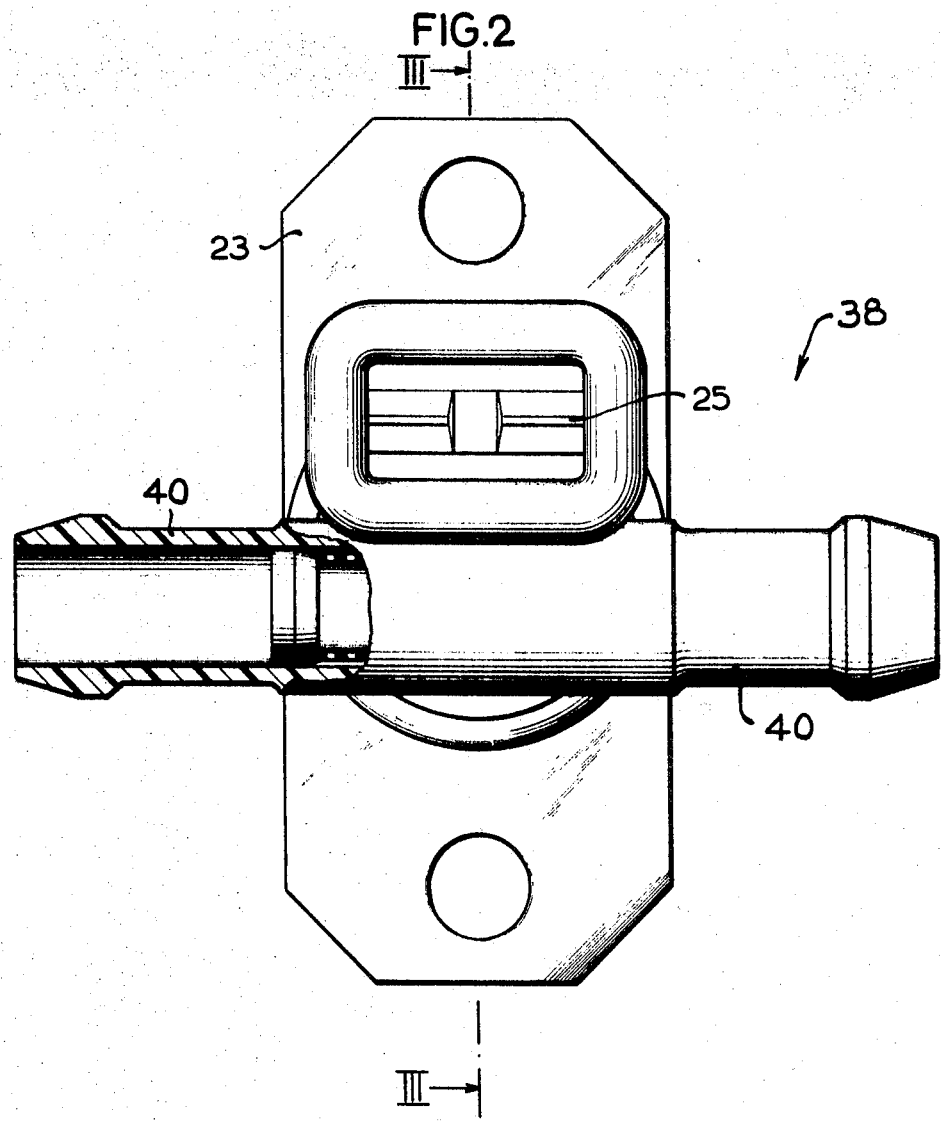

INVENTORS
Walter SCHLAGMÜLLER
Otto GLÖCKLER
Dieter EICHLER
Hans ZELLER
Rudolf BABITZKA
By their ATTORNEY United States Patent Office 3,614,945
Patented Oct. 26, 1971

1

3,614,945
VALVE FOR ADMITTING FUEL INTO INTAKE
MANIFOLDS OF INTERNAL COMBUSTION
ENGINES DURING STARTING
Walter Schlagmüller, Butthard, Hans Zeller, Doffingen, Rudolf Babitzka, Ludwigsburg-Hoheneck, Otto Glöckler, Renningen, and Dieter Eichler, Bonlanden, Germany, assignors to Robert Bosch GmbH, Stuttgart, Germany
Filed July 22, 1969, Ser. No. 843,378
Claims priority, application Germany, July 31, 1968,
P 17 51 802.4
Int. Cl. F02n 17/08
U.S. Cl. 123—179 L         16 Claims

ABSTRACT OF THE DISCLOSURE

An internal combustion engine with fuel injection into the intake manifold wherein an electromagnetic valve admits additional fuel into the intake manifold in response to actuation of the starter. The valve can admit fuel continuously or intermittently, either during the time of actuation of the starter or during this time and for an additional predetermined interval of time following termination of such actuation. The coil of the valve is energized on closing of the starter switch whereby the fuel can flow through a passage of predetermined volume and issues from the orifice of an atomizing nozzle which is installed in the intake manifold.

BACKGROUND OF THE INVENTION

The present invention relates to internal combustion engines in general, and more particularly to improvements in systems which admit fuel to the cylinders of internal combustion engines. Still more particularly, the invention relates to improvements in devices which admit fuel to intake manifolds of internal combustion engines.

It is known that the intake manifold or manifolds should receive increased amounts of fuel when an internal combustion engine is started, especially if the engine is cold. In accordance with a presently utilized method, the injection of fuel is regulated by an electronic control unit which prolongs the intervals of fuel admission during starting of the engine. A drawback of such proposal is that the outlay for electrical and electronic parts is very high.

SUMMARY OF THE INVENTION

An object of the invention is to provide a novel and improved auxiliary valve which admits to the intake manifold of an internal combustion engine controlled quantities of fuel in automatic response to operation of the starter.

Another object of the invention is to provide an auxiliary fuel admitting valve which admits fuel at a controlled rate and which also determines the total amount of admitted fuel.

A further object of the invention is to provide an auxiliary fuel admitting valve which can be utilized with particular advantage in internal combustion engines wherein the injection of fuel into the intake manifold or manifolds during normal operation of the engine is regulated by electronic means.

2

The invention is embodied in an internal combustion engine with fuel injection, particularly in an engine wherein the injection of fuel is regulated by an electronic control unit. The engine comprises intake manifold means, starter means actuatable to start the engine, fuel injection means preferably including a separate fuel injection valve for each cylinder of the engine, and an auxiliary valve which preferably includes an electromagnetic valve operative to admit fuel into the intake manifold means in response to actuation of the starter means. The electromagnetic valve preferably comprises an atomizing nozzle having an outlet orifice which dischagres atomized fuel into the intake manifold means, at least while the starter means is being actuated or during actuation of starter means and for a predetermined interval of time following termination of actuation of the starter means. This can be achieved by providing the electromagnetic valve with a passage which can store a given quantity of fuel or by employing a time delay device which maintains the valve in open position for a desired period of time subsequent to opening of the starter circuit.

The novel features which are considered as characteristic of the invention are set forth in particular in the appended claims. The improved auxiliary valve itself, however, both as to its construction and its mode of operation, together with additional features and advantages thereof, will be best understood upon persual of the following detailed description of certain specific embodiments with reference to the accompanying drawing.

BRIEF DESCRIPTION OF THE DRAWING

FIG. 2 is a plan view of the auxiliary valve, with a portion of the fuel line broken away;

DESCRIPTION OF THE PREFERRED
EMBODIMENTS

Figure 1:
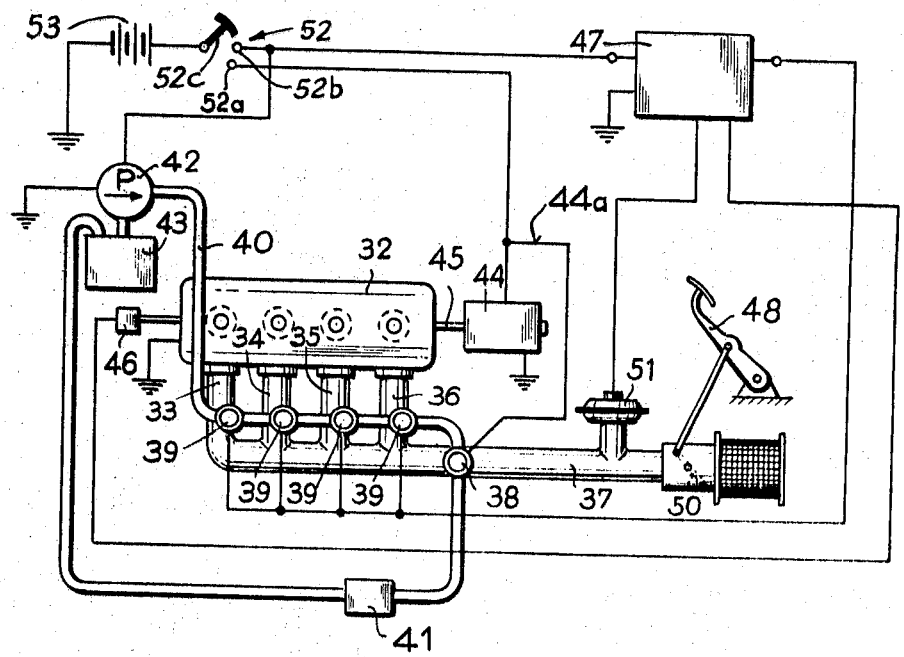
FIG. 1 is a diagrammatic view of an internal combustion engine which embodies the improved auxiliary valve.

FIG. 1 illustrates a fuel injection system for a four-cylinder internal combustion engine 32. Four branch feed pipes 33, 34, 35, 36 of an intake manifold 37 are connected with the respective cylinders of the engine 32. The auxiliary valve 38 of the present invention extends into the intake manifold 37. Each of the branch feed pipes 33–36 is associated with one of four electromagnetically actuatable fuel injection valves 39. A fuel line 40 supplies fuel to the auxiliary valve 38 and to the fuel injection valves 39; this fuel line 40 is connected to the outlet of a fuel pump 42 which draws fuel from a tank 43. A pressure regulator 41 in the fuel line 40 maintains the fuel pressure at a constant value, e.g., at about two atmospheres above atmospheric pressure.

A starter 44 is connected with the engine 32 by means of a shaft 45. The engine 32 is further connected with a revolution counter 46 which transmits appropriate signals to an electronic control unit 47. The rotational speed of the engine 32 is a function of the position of a foot pedal 48 which controls the position of a throttle valve 50 in the intake manifold 37. The pressure in the intake manifold 37 is monitored by a signal generator 51 which is electrically connected with the control unit 47.

When the engine 32 is to be started, the operator closes a starter switch 52 by moving the movable contact 52c into engagement with the fixed contacts 52a and 52b. The battery 53 is then connected in circuit with the starter 44 which rotates the shaft 45 to start the engine 32. The auxiliary valve 38 is opened simultaneously with closing of the starter switch 52, and the control unit 47 sends to the fuel injection valves 39 intermittent signals to effect injection of fuel into the branch feed pipes 33–36. When the movable contact 52c of the starter switch 52 is disengaged from the contact 52a but continues to engage the contact 52b, the starter 44 is disconnected from the battery 53 whereby the auxiliary valve 38 closes. Thus, the cylinders of the engine 32 thereupon receive only such fuel which is admitted by way of injection valves 39 under the control of the unit 47.

Figure 7:
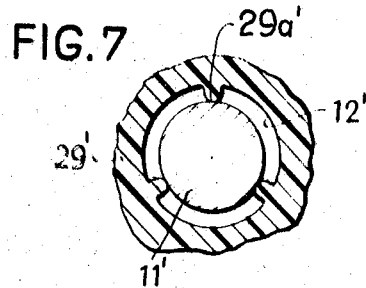
FIG. 7 is a fragmentary sectional view of a detail in a further auxiliary valve.
Figure 3:
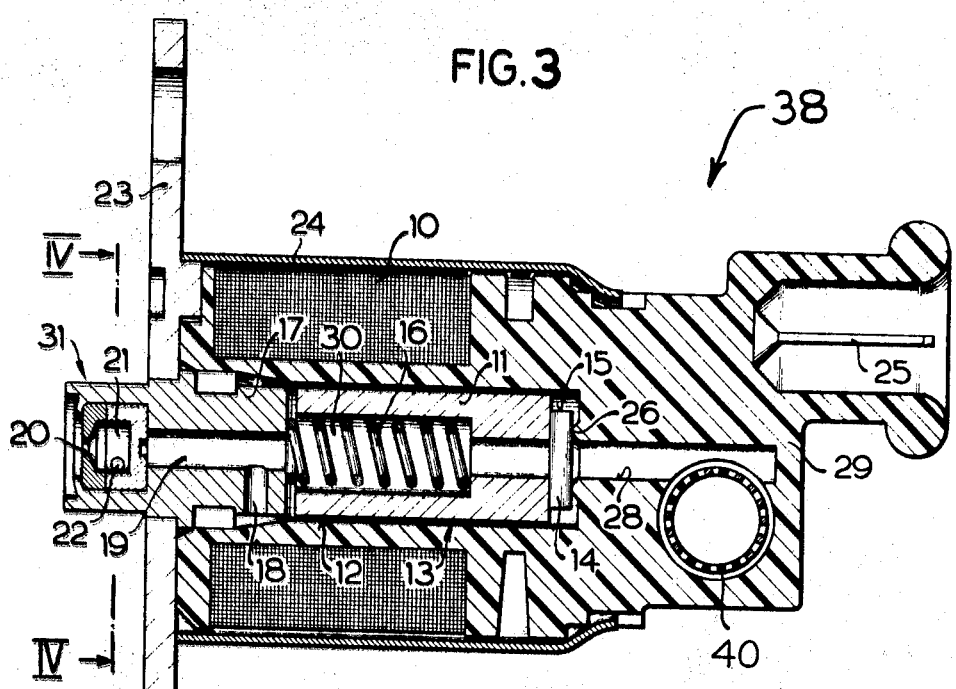
FIG. 3 is a sectional view as seen in the direction of arrows from the line III—III of FIG. 2.

The construction of the auxiliary valve 38 is illustrated in FIGS. 2 and 3. This valve is an electromagnetic valve and comprises a coil 10 surrounding a substantially cylindrical armature 11 which is guided in a bore 12 of the valve body 29. Approximately one-third of the armature 11 extends inwardly beyond the coil 10 and the periphery of this armature is formed with axially parallel flats 13 (or flutes) to permit the flow of fuel along the surface surrounding the bore 12. Alternatively, and as shown in FIG. 7, the armature 11' can constitute a circular cylinder and the valve body 29' can be provided with inwardly extending axially parallel projections or ribs 29a' which center the armature and cause the latter to define with the valve body a set of axially extending channels 12' for the flow of fuel.

Referring again to FIGS. 2 and 3, the inner end of the armature 11 is provided with a square plate-like valve member 14 which consists of highly heat-resistant synthetic plastic material and whose corners 15 engage the surface surrounding the bore 12 so that the valve member is properly centered and guided in the body 29.

Figure 4:
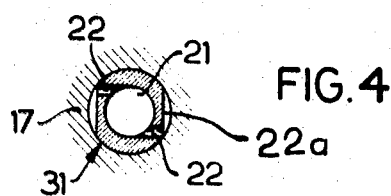
FIG. 4 is a sectional view of a detail as seen in the direction of arrows from the line IV—IV of FIG. 3.

A bore 30 in the outer portion of the armature 11 accommodates the major part of a helical valve spring 16 which reacts against a magnet core 17 and biases the valve member 14 against an annular seat 26 of the valve body 29. The magnet core 17 has an axial bore 19 and a radial bore 18 which latter communicates with the bores 12 and 19. The bore 19 admits fuel to a two-piece nozzle 31 which is mounted in the outer end portion of the magnet core 17 and has a fuel discharging outlet or orifice 20 and a fuel chamber 21 in communication with the orifice 20. The chamber 21 further communicates with the bore 19 of the magnet core 17 in a manner as best shown in FIG. 4. The rear portion of the nozzle 31 is formed with tangential ports 22 and with external flats 22a which permit fuel to flow from the bore 19 to the ports 22 and thence into the chamber 21. The front portion of the nozzle 31 defines the orifice 20.

The volume of the composite fuel passage between the seat 26 and the orifice 20 (this passage includes the unoccupied part of bore 12, the bores 18, 19, 30, ports 22 and chamber 21) is such that it accommodates more fuel than can be discharged via orifice 20 during the interval when the valve member 14 is remote from the seat 26. Thus, the just mentioned passage constitutes a fuel reservoir which can admit to the orifice 20 fuel for a given period of time subsequent to reengagement of the valve member 14 with the seat 26.

The magnet core 17 is surrounded by and affixed to a flange 23 which is secured to the intake manifold 37. The flange 23 further carries a housing which is a piece of iron pipe 24 surrounding the coil 10 and a portion of the valve body 29. One terminal 25 of the coil 10 is connected with the conductor 44a (FIG. 1) which connects the coil with the fixed contact 52a of the starter switch 52. The fuel line 40 admits fuel to a bore 28 of the valve body 29. The inner end of the bore 28 is surrounded by the seat 26. The body 29 consists of insulating synthetic plastic material.

The operation:

When the circuit of the coil 10 is completed in response to closing of the starter switch 52 in such a way that the movable contact 52c engages the fixed contacts 52a and 52b, the armature 11 is caused to move toward the core magnet 17. The magnetic circuit is completed through the armature 11, core magnet 17, flange 23 and the housing 24.

The valve member 14 is moved away from the seat 26 in response to fuel pressure in the bore 28 whereby the fuel flows into the bore 12, along the flats or flutes 13 of the armature 11, through bores 18, 19, along flats 22a, through ports 22 and into the chamber 21. The fuel which issues from the tangentially extending ports 22 is set in rotary motion and the orifice 20 discharges a finely atomized spray which enters the intake manifold 37 upstream of the branch feed pipes 33–36. When the coil 10 is deenergized in response to movement of the contact 52c away from the contact 52a, the spring 16 expands and returns the valve member 14 into sealing engagement with the seat 26. However, the orifice 20 continues to discharge into the intake manifold 37 such fuel which fills the bores 12, 18, 19, chamber 20 and the bore 30 of the armature 11 subsequent to sealing of the bore 28 from the bore 12. The major part of such reserve fuel is contained in the bores 18, 19, 30 and chamber 21. The evacuation of remaining fuel is caused by suction in the intake manifold 37. The length of the interval during which the orifice 20 continues to admit fuel into the intake manifold 37 depends on the capacity of the aforementioned passage and can be selected in advance by appropriate dimensioning of one or more portions of such passage, especially bores 19 and 30.

Figure 5:
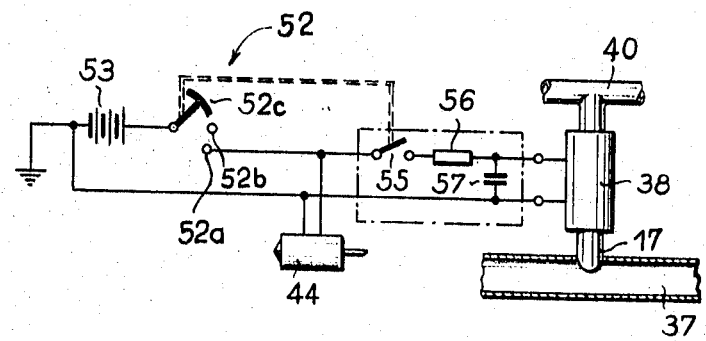
FIG. 5 is a fragmentary partly elevational and partly sectional view of an engine wherein the closing of the auxiliary valve can be delayed by an electrical time delay device.

In accordance with a modification which is shown in FIG. 5, the closing of the valve member 14 can be delayed by a time delay device which is in circuit with the coil 10 and starter switch 52. When the contact 52c engages the contact 52a, the starter 44 is in circuit with the battery 53 to start the engine 32 (not shown in FIG. 5). The coil 10 is energized and moves the valve member 14 away from the seat 26 so that the orifice 20 admits atomized fuel into the intake manifold 37. A switch 55 which is mechanically connected with the movable contact 52c is closed when the contact 52c engages the fixed contact 52a to thus complete the circuit of the coil 10 in the auxiliary valve 38. The switch 55 is in series with a resistor 56 which charges a capacitor 57. When the contact 52c moves from the contact 52a (but still engages the contact 52b), the switch 55 opens and the capacitor 57 discharges to maintain the coil 10 in energized condition for a predetermined interval of time subsequent to opening of the switch 55. The time delay device of FIG. 5 can be utilized as a substitute for or in addition to the aforementioned passage which can store fuel in the auxiliary valve 38.

Figure 6:
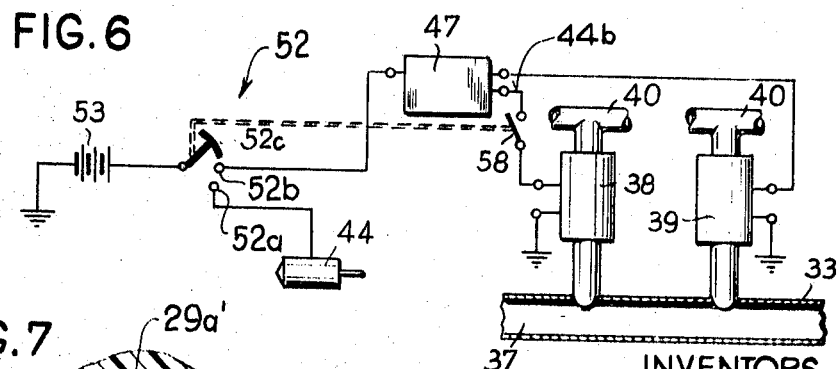
FIG. 6 is a similar fragmentary partly elevational and partly sectional view of an engine wherein the auxiliary valve is designed to effect intermittent admission of fuel into the intake manifold.

FIG. 6 illustrates a further modification in accordance with which the auxiliary valve 38 is repeatedly opened at predetermined intervals while the contact 52c of the starter switch 52 engages the fixed contact 52a. The coil 10 of the valve 38 is in circuit with the electronic control unit 47 by way of a conductor 44b which replaces the conductor 44a of FIG. 1 and contains a normally open switch 58 whose movable contact is mechanically connected with the movable contact 52c. The switch 58 is closed only while the contact 52c engages the fixed contact 52a. The coil 10 is then energized at intervals determined by the control unit 47. The intermittent opening and closing of the switch 58 continues while the switch 52 connects the starter 44 in circuit with the battery 53. FIG. 6 further shows one of the fuel injection valves 39 which is opened simultaneously with closing of the switch 58.

An electronic control unit which can be utilized in the fuel injection system of the present invention is disclosed, for example, in Pat. No. 3,338,221 granted on Aug. 29, 1967 to Hermann Scholl and assigned to the same assignee.

An important advantage of the auxiliary valve 38 is that it comprises a relatively small number of simple parts. Also, the flange 23 and housing 24 form part of the circuit for the magnetic flux. The valve 38 can be readily installed in existing fuel injection systems. The length of the interval during which the valve 38 continues to admit fuel to the intake manifold 37 subsequent to deactivation of the starter 44 can be selected at will and with a high degree of accuracy. The outlay for the provision of a fuel reservoir in the valve 38 or for the time delay device of FIG. 6 is justified in view of the fact that the valve invariably insures an increased supply of fuel during starting of the engine. Such increased rate of fuel delivery to the intake manifold 37 is particularly desirable when the engine is cold, i.e., when the starter 44 is operated after prolonged idleness of the engine.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In an internal combustion engine with fuel injection, particularly in an engine wherein the injection of fuel is regulated by an electronic control unit, a combination comprising intake manifold means; starter means actuatable to start the engine; fuel injection means; auxiliary valve means operative to admit into said intake manifold means fuel in response to actuation of said starter means; and a low pressure fuel line leading fuel from said injection means to said auxiliary valve means.

2. A combination as defined in claim 1, wherein said auxiliary valve means includes a valve member movable to and from an open position in which it effects admission of fuel to said intake manifold means, and means for maintaining said valve member in open position during the entire interval of actuation of said starter means.

3. A combination as defined in claim 1, wherein said auxiliary valve means includes a valve member movable to and from an open position in which it effects admission of fuel to said intake manifold means, means for opening said valve member in response to actuation of said starter means, and means for effecting closing of said valve member with a predetermined delay following termination of actuation of said starter means.

4. A combination as defined in claim 1, wherein said auxiliary valve means comprises a valve member movable to and from an open position in which it effects admission of fuel to said intake manifold means, and means for intermittently opening said valve member in response to actuation of said starter means.

5. A combination as defined in claim 4, wherein said auxiliary valve means comprises an electromagnetic valve having an armature which includes said valve member, said means for intermittently opening said valve member comprising means for effecting repeated completion of the circuit of said electromagnetic valve.

6. A combination as defined in claim 1, wherein said auxiliary valve means comprises an electromagnetic valve having an outlet arranged to discharge fuel into said intake manifold means, a passage which accommodates a supply of fuel and communicates with said outlet, and means for supplying fuel to said passage during actuation of said starter means so that said outlet continues to admit to the manifold means fuel upon completion of actuation of said starter means until the supply of fuel in said passage is exhausted.

7. A combination as defined in claim 6, wherein said passage includes at least one bore.

8. A combination as defined in claim 1, wherein said auxiliary valve means comprises an electromagnetic valve having magnetic circuit means and a coil energizable in response to actuation of said starter means for creating a magnetic flux in said magnetic circuit means when energized, a valve member movable to an open position to effect admission of fuel into said manifold means in response to energization of said coil, and a housing of magnetically conductive material forming part of said magnetic circuit means and being secured to said intake manifold means.

9. A combination as defined in claim 8, wherein said housing includes a pipe surrounding said coil and a flange securing said pipe to said intake manifold means.

10. A combination as defined in claim 8, wherein said electromagnetic valve further comprises a fixed magnet core and an armature which includes said valve member, said armature providing with said magnet core and said housing a path for the magnetic flux which develops on energization of said coil.

11. A combination as defined in claim 10, wherein said armature has a first portion surrounded by said coil and a second portion extending beyond said coil, the length of said second portion approximating half the length of said first portion.

12. A combination as defined in claim 1, wherein said auxiliary valve means includes an electromagnetic valve having an outlet arranged to discharge fuel into said manifold means, a body defining a passage communicating with said outlet, a seat provided in said body between said passage and said fuel line, and an armature having a portion normally abutting against said seat, said passage including a bore receiving said armature and the latter having at least one longitudinally extending flat to permit flow of fuel from said fuel line to said outlet when the armature is moved away from said seat.

13. A combination as defined in claim 1, wherein said auxiliary valve means includes an electromagnetic valve having an outlet arranged to admit fuel to said manifold means, a body defining a passage communicating with said outlet, a seat provided in said body between said passage and said fuel line, and an armature having a portion normally engaging said seat, said armature being of substantially cylindrical shape and said passage including a bore reciprocably receiving said armature, said body having projections extending into said bore and engaging said armature so that the latter defines in said bore a plurality of channels in which fuel can flow toward said outlet in response to movement of said armature away from said seat.

14. A combination as defined in claim 1, wherein said auxiliary valve means includes an electromagnetic valve having an outlet arranged to admit fuel into said manifold means, a body defining a passage including a bore which communicates with said outlet, a seat provided in said body between said fuel line and said bore, and an armature reciprocably received in said bore and having a polygonal valve member normally engaging said seat to prevent entry of fuel into said passage, said valve member having corner portions engaging the surface of said body in said bore.

15. A combination as defined in claim 14, wherein said valve member consists of highly heat resistant material and wherein said seat is a ring-shaped seat.

16. A combination as defined in claim 1, wherein said auxiliary valve means includes an electromagnetic valve having a body of insulating plastic material, a coil mounted in said body and having terminal means extending through said body of insulating material and being accessible from the exterior of said body, said fuel line supplying fuel into said body.

References Cited

UNITED STATES PATENTS

| 2,332,909 | 10/1943 | Fuscaldo | 251—139 |
|---|---|---|---|
| 2,981,246 | 4/1961 | Woodward | 123—32 |
| 3,004,720 | 10/1961 | Knapp et al. | 251—141 |
| 3,020,905 | 2/1962 | Goschel et al. | 123—140.3 |
| 3,304,013 | 2/1967 | O'Brien | 239—468 |
| 3,416,738 | 12/1968 | Jackson | 123—139 |
| 3,450,353 | 6/1969 | Eckert | 251—141 |

FOREIGN PATENTS

| 398,331 | 3/1909 | France | 251—141 |
|---|---|---|---|

MARK M. NEWMAN, Primary Examiner

C. R. FLINT, Assistant Examiner

U.S. Cl. X.R.

123—179 G, 32 EA, 187.5 R; 251—141